(12) United States Patent
Horng et al.

(10) Patent No.: US 8,550,720 B2
(45) Date of Patent: Oct. 8, 2013

(54) POSITIONING DEVICE FOR MOTOR BEARING

(75) Inventors: Alex Horng, Kaohsiung (TW); Duo-Nian Shan, Kaohsiung (TW)

(73) Assignee: Sunonwealth Electronic Machine Industry Co., Ltd., Kaohsiung (TW)

( * ) Notice: Subject to any disclaimer, the term of this patent is extended or adjusted under 35 U.S.C. 154(b) by 556 days.

(21) Appl. No.: 12/545,901

(22) Filed: Aug. 24, 2009

(65) Prior Publication Data

US 2011/0044570 A1 Feb. 24, 2011

(51) Int. Cl.
*F16C 33/02* (2006.01)
*F16C 32/06* (2006.01)

(52) U.S. Cl.
USPC .............................. 384/296; 384/100; 384/107

(58) Field of Classification Search
USPC ............ 384/276–301, 100, 107–120; 310/90, 310/67 R; 417/354, 423.12; 360/99.08, 360/98.07
See application file for complete search history.

(56) References Cited

U.S. PATENT DOCUMENTS

| 6,024,496 | A * | 2/2000 | Shy ................................ 384/279 |
| 6,592,263 | B2 * | 7/2003 | Chuang .......................... 384/125 |
| 7,070,336 | B2 | 7/2006 | Horng et al. |
| 7,342,336 | B1 * | 3/2008 | Horng et al. .................... 310/90 |
| 2004/0228559 | A1 | 11/2004 | Horng et al. |

FOREIGN PATENT DOCUMENTS

TW    200822497    5/2008

* cited by examiner

*Primary Examiner* — Alan Waits
(74) *Attorney, Agent, or Firm* — Alan Kamrath; Kamrath IP Lawfirm, P.A.

(57) ABSTRACT

A positioning device includes a shaft tube having a receptacle receiving a support member that includes first and second ends spaced along an axis. The support member further includes a through-hole extending from the first end through the second end. A bearing is received in the receptacle and includes an end facing the first end of the support member. The end of the bearing includes an inclined pressing surface aligned with a support portion formed on the first end of the support member. The pressing surface deforms the support portion when the bearing is pushed downward during assembly. The deformed support is received in a groove between the pressing surface and an inner periphery of the receptacle to offset and absorb the downward pressing force. The bearing is, thus, reliably fixed in the desired assembly position while preventing the support member from being damaged or generating noise during operation.

13 Claims, 6 Drawing Sheets

POSITIONING DEVICE FOR MOTOR BEARING

BACKGROUND OF THE INVENTION

1. Field of the Invention

The present invention relates to a positioning device for a motor bearing and, more particularly, to a positioning device capable of reliably positioning a motor bearing in a predetermined position.

2. Description of the Related Art

FIG. 1 shows a conventional motor including a rotor 91, a stator 92, and a base 93. The rotor 91 includes a shaft 911. The base 93 includes a shaft tube 931 around which the stator 92 is mounted. An abrasion-resistant plate 932, a restraining member 933, a bearing 934, and a washer 935 are mounted in the shaft tube 931. A positioning member 936 is mounted on a top end of the shaft tube 931 to prevent disengagement of the elements received in the shaft tube 931. In assembly, the shaft 911 of the rotor 91 is extended through the positioning member 936, the washer 935, the bearing 934, and the restraining member 933. The restraining member 933 extends into an annular groove defined in a neck portion of the shaft 911, preventing disengagement of the shaft 911. The stator 92 can drive the rotor 91 to rotate. The bearing 934 presses against the restraining member 933 and is retained in a predetermined position in the shaft tube 931. An example of such a motor is disclosed in Taiwan Publication No. 200822497. However, positioning of the bearing 934 in the shaft tube 931 in an axial direction is not reliable. Specifically, in a case that the bearing 934 is too low in the axial direction, the restraining member 933, if made from a high-molecular material, is liable to be damaged by the downwardly pressing force imparted from the bearing 934 (FIG. 2). On the other hand, with reference to FIG. 3, a gap exists between the restraining member 933 and the bearing 934 when the bearing 934 is too high in the axial direction, such that the bearing 934 can not be positioned. Thus, the restraining member 933 and the bearing 934 will move up and down in the axial direction during rotation of the shaft 911 and generate noise.

SUMMARY OF THE INVENTION

The primary objective of the present invention is to provide a positioning device for a motor bearing capable of reliably positioning the motor bearing in a predetermined position.

Another objective of the present invention is to provide a positioning device for a motor bearing capable of avoiding damage to a support member resulting from direct pressing by the motor bearing.

A further objective of the present invention is to provide a positioning device for a motor bearing avoiding generation of noise during operation of a motor utilizing the positioning device.

The present invention fulfills the above objectives by providing, in a preferred form, a positioning device including a shaft tube having a receptacle. A support member is received in the receptacle. The support member includes first and second ends spaced along an axis. The support member further includes a through-hole extending from the first end through the second end along the axis. The through-hole includes an inner periphery having a restraining portion. The first end of the support member includes a support portion. A bearing is received in the receptacle and includes an end facing the first end of the support member. The end of the bearing includes an inclined pressing surface aligned with the support portion of the support member.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
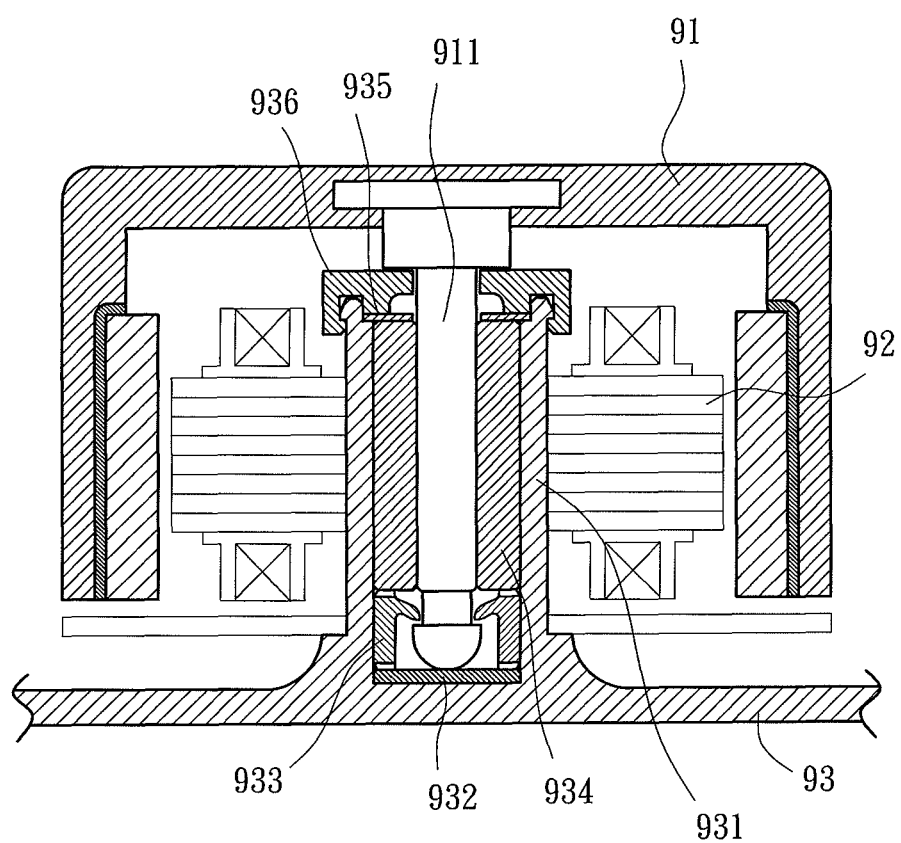
FIG. 1 shows a cross sectional view of a conventional motor.
Figure 2:
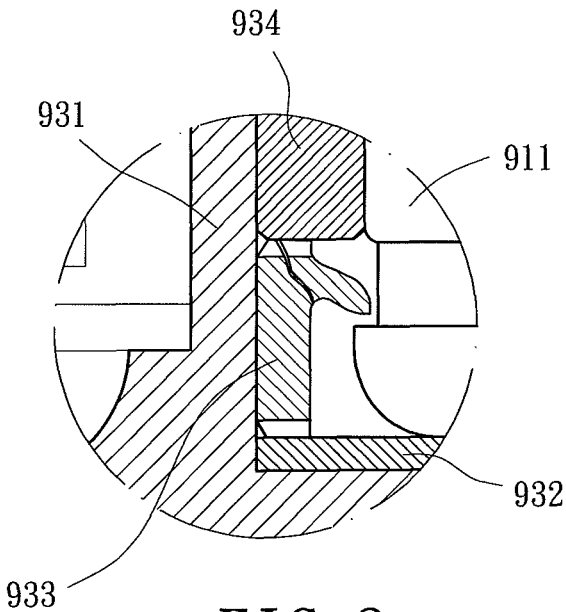
FIG. 2 shows an enlarged, cross sectional view of a portion of the motor of FIG. 1 with a bearing in a lower position.
Figure 3:
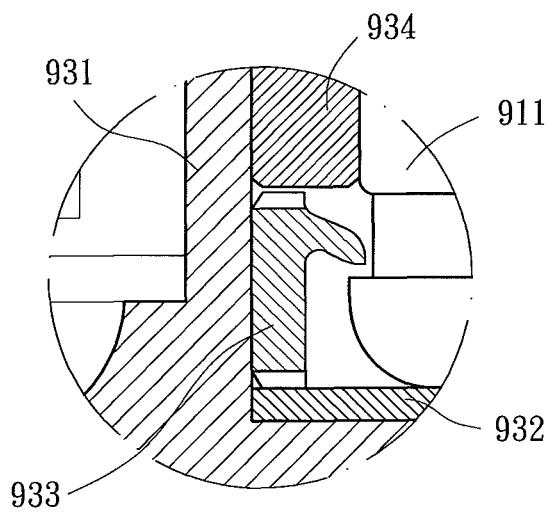
FIG. 3 shows an enlarged, cross sectional view of a portion of the motor of FIG. 1 with the bearing in a higher position.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "portion", "axial", "radial", "annular", "inward", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 4:
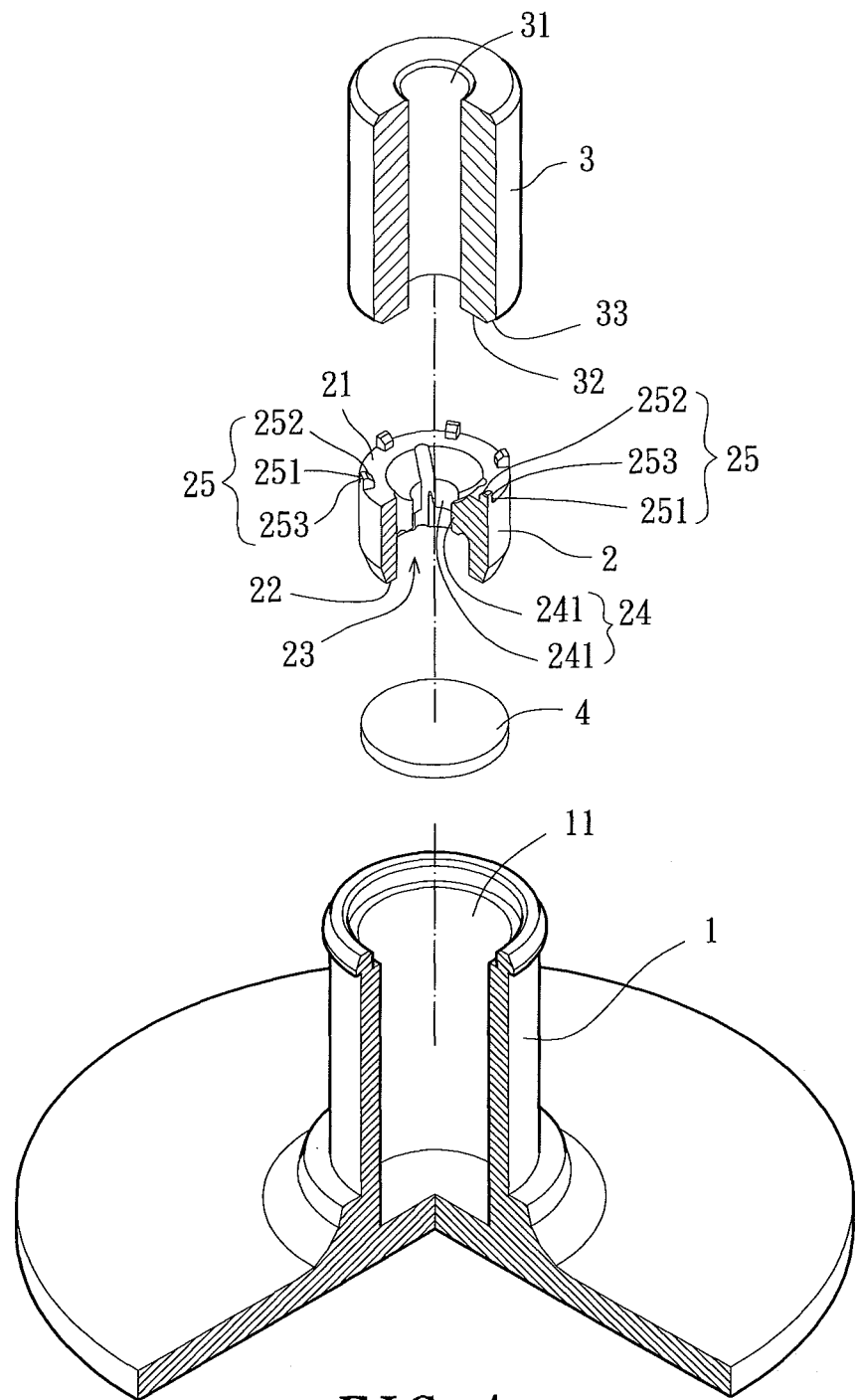
FIG. 4 shows an exploded, perspective view of a positioning device for a motor bearing according to the preferred teachings of the present invention with portions broken away.

With reference to FIG. 4, a positioning device for a motor bearing according to the preferred teachings of the present invention generally includes a shaft tube 1, a support member 2, and a bearing 3. The shaft tube 1 is adapted to engage with a stator of a motor. The bearing 3 supports a rotor of the motor. The stator is capable of driving the rotor to rotate.

The shaft tube 1 includes a receptacle 11 in the preferred form shown as a blind hole. However, the receptacle 11 can be a through-hole.

The support member 2 includes first and second ends 21 and 22 spaced along an axis about which the rotor extends. The support member 2 further includes a through-hole 23 extending from the first end 21 through the second end 22 along the axis. The through-hole 23 includes a restraining portion 24 in the preferred form shown having a plurality of restraining plates 241 extending inward from an inner periphery of the through-hole 23 in a radial direction perpendicular to the axis. The first end 21 of the support member 2 includes a support portion 25 in the preferred form shown having a plurality of protrusions 251 formed on an end face of the first end 21 of the support member 2. The end face of the first end 21 of the support member 2 includes inner and outer peripheral edges spaced in the radial direction. The protrusions 251 are annularly spaced at regular intervals. Each protrusion 251 extends from the outer peripheral edge in the radial direction towards but spaced from the inner peripheral edge. Each protrusion 251 further includes a supporting surface 252 in the preferred form shown as an inclined face. However, the supporting surface 252 can be an arcuate surface. Further, each protrusion 251 has an outer surface 253 flush with an outer periphery of the bearing 2.

The bearing 3 includes a shaft hole 31 extending from a first end 32 through a second end of the bearing 3 spaced from the first end 32 along the axis. The first end 32 of the bearing 3 is a coupling end that couples with the support member 2. The first end 32 of the bearing 3 includes a pressing surface 33 preferably extending along a peripheral edge of the first end 32, forming an annular surface adjoining the first end 32 and an outer periphery of the bearing 3. The pressing surface 33 is an annular inclined surface in the preferred form shown. However, the pressing surface 33 can be an annular arcuate surface.

Figure 5:
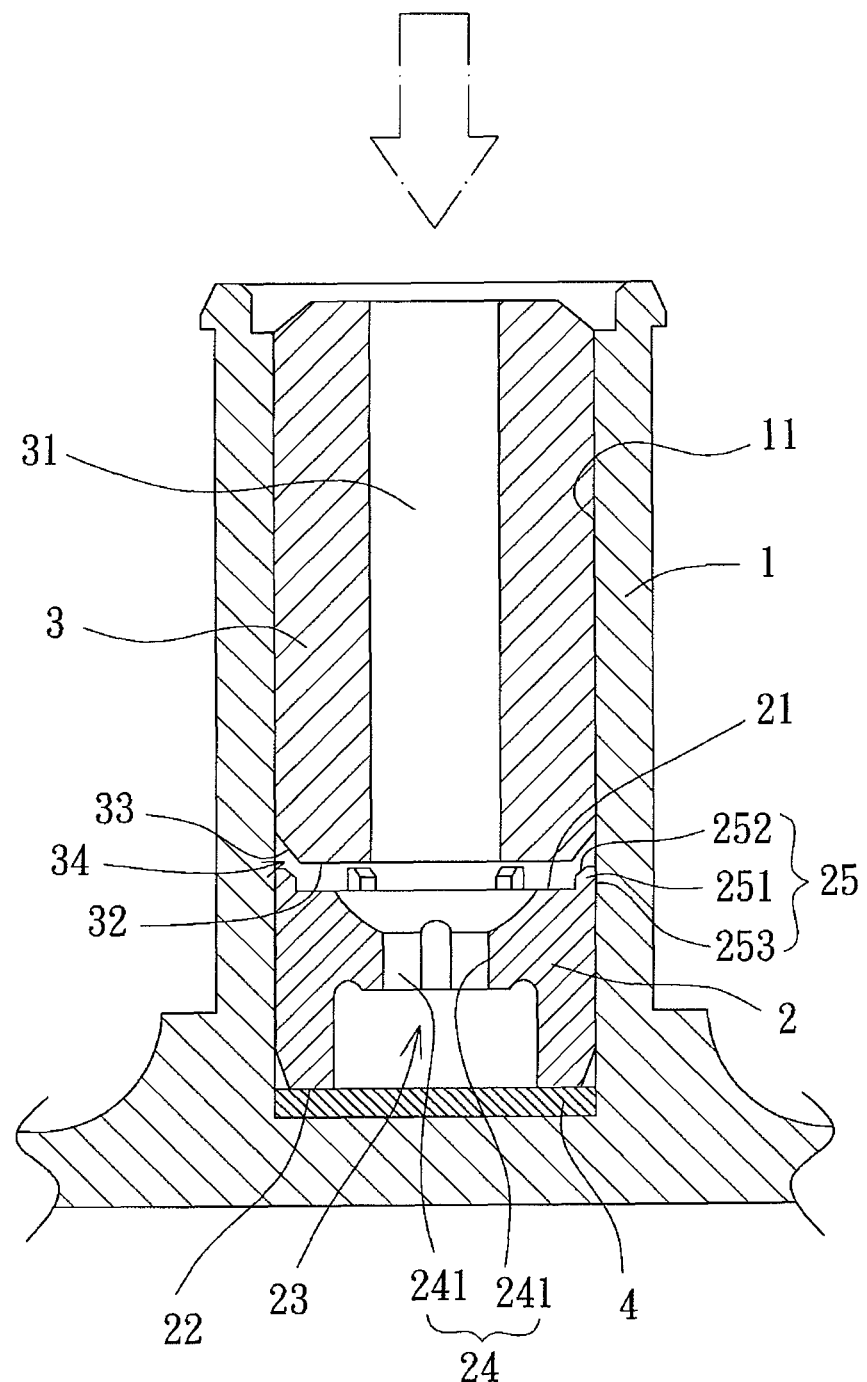
FIG. 5 shows a cross sectional view of the positioning device of FIG. 4, illustrating assembling of the positioning device.

With reference to FIGS. 4 and 5, in assembly, the support member 2 and the bearing 3 are placed into the receptacle 11 of the shaft tube 1 with the first end 32 of the bearing 3 facing the first end 21 of the support member 2, with the support portion 25 of the support member 2 aligned with the pressing surface 33 of the bearing 3, and with the supporting surface 252 of each protrusion 251 facing the pressing surface 33 of the bearing 3. The outer periphery of the bearing 3 is in tight engagement with the inner periphery of the receptacle 11, so that the bearing 3 can be positioned in a predetermined position in the receptacle 11 along the axis while preventing the support member 2 from disengaging from the shaft tube 1. The receptacle 11 of the shaft tube 1 can further receive an abrasion-resistant plate 4 abutting the second end 22 of the support member 2.

Figure 6:
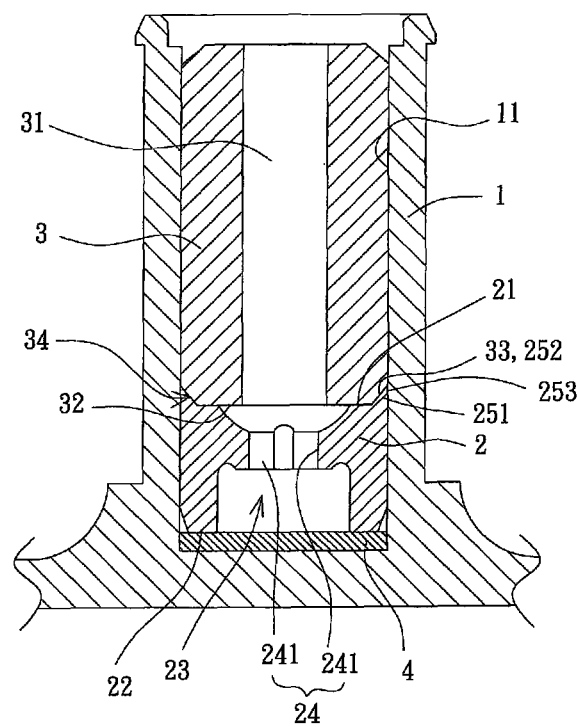
FIG. 6 shows a cross sectional view of the positioning device of FIG. 4 with the positioning device assembled.

With reference to FIGS. 5 and 6, after the bearing 3 is placed into the receptacle 11 of the shaft tube 1, a groove 34 is defined between the pressing surface 33 of the bearing 3 and the inner periphery of the receptacle 11. The groove 34 has a cross sectional area perpendicular to the axis smaller than any cross sectional area of the support portion 25 perpendicular to the axis.

The bearing 3 is pushed downward along the axis until the pressing surface 33 of the bearing 3 comes in contact with and presses against the supporting surfaces 252 of the support portion 25 of the support member 2. The support member 2 is made of a material (such as a high-molecular material) softer than the bearing 3, such that the pressing force from the bearing 3 causes deformation of each protrusion 251 of the support portion 25 when the pressing surface 33 of the bearing 3 presses against the supporting surfaces 252. The deformed protrusions 251 are received in the groove 34 between the pressing surface 33 and the inner periphery of the receptacle 11 (FIG. 6). Deformation of the protrusions 251 resulting from downward pressing of the bearing 3 offsets the downward pressing force imparted from the bearing 3, such that the downward pressing force will not be directly imparted to the first end 21 of the support member 2, avoiding damage to the support member 2. Furthermore, each protrusion 251 deformed by the downward pressing force of the bearing 3 fills the groove 34, such that the pressing surface 33 can tightly and simultaneously press against each protrusion 251, further tightly fixing the support member 2 in the receptacle 11. It can be appreciated that the outer surface 253 of each protrusion 251 is in intimate contact with and presses against the inner periphery of the receptacle 11. By such an arrangement, the support member 2 and the bearing 3 can be reliably fixed in predetermined positions in the receptacle 11 without the risk of disengagement. Loosening of the support member 2 and the bearing 3 is, thus, avoided. As a result, noise is less likely to occur during rotation of a motor utilizing the positioning device according to the preferred teachings of the present invention.

Figure 7:
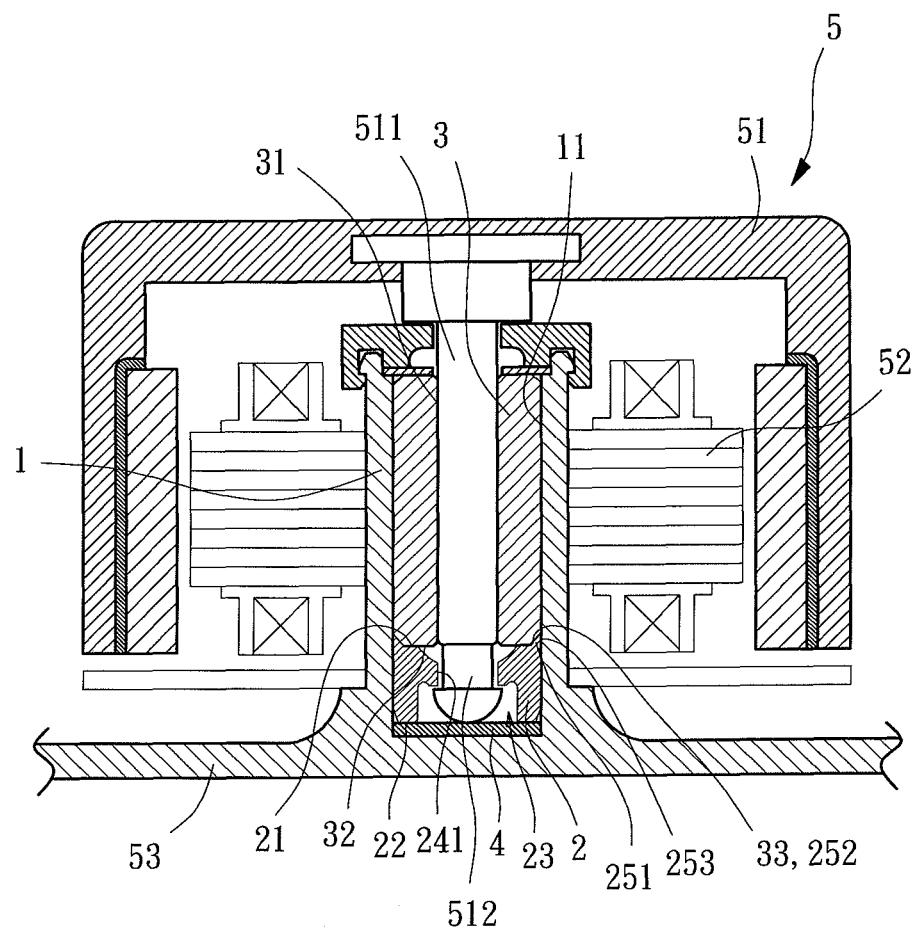
FIG. 7 shows a cross sectional view of a motor utilizing the positioning device of FIG. 4.

FIG. 7 shows utilization of the positioning device according to the preferred teachings of the present invention in a motor 5 including a rotor 51, a stator 52, and a base 53. An end of a shaft 511 is coupled to the rotor 51. The other end of the shaft 511 includes a neck portion 512 defining an annular groove. The shaft tube 1 of the positioning device according to the preferred teachings of the present invention is formed on the base 53 of the motor 5 with the stator 52 mounted around the shaft tube 1. In the preferred form shown, the shaft tube 1 integrally extends from the base 53. However, the shaft tube 1 can be coupled to the base 53 by any suitable provision.

In assembly of the motor 5, the shaft 511 of the rotor 51 is extended through the shaft hole 31 of the bearing 3 and the through-hole 23 of the support member 2 with the other end of the shaft 511 in contact with the abrasion-resistant plate 4 and with each restraining plate 241 received in the annular groove of the neck portion 512 of the shaft 511. The stator 52 drives the rotor 51 to rotate.

As mentioned above, the support portion 25 on the first end 21 of the support member 2 is aligned with the pressing surface 33 of the bearing 3. When the bearing 3 is pressed downward, the pressing surface 33 deforms each protrusion 251 of the support portion 25, and the deformed protrusions 251 are received in the groove 34 defined between the pressing surface 33 and the inner periphery of the receptacle 11, offsetting and absorbing the downward pressing force of the bearing 3 and avoiding damage to the support member 2 by the downward pressing force. Furthermore, when the protrusions 251 are pressed by the pressing surface 33 to press against the inner periphery of the receptacle 11, the bearing 3 can be reliably fixed in the predetermined assembly position while tightly fixing the support member 2 in the receptacle 11. Noise during operation of the motor 5 is, thus, avoided.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:
1. A positioning device for a motor bearing comprising:
a shaft tube including a receptacle having an inner periphery;
a support member comprising:
an outer periphery slideably received in the inner periphery of the receptacle;
first and second ends spaced along an axis;
a through-hole extending from the first end through the second end along the axis, the through-hole including an inner periphery having a diameter and including a restraining portion having a diameter smaller than the diameter of the inner periphery of the through-hole;
a support portion extending axially along the outer periphery of the support member beyond the first end of the support member, the support portion having a supporting surface;
a bearing comprising:

an outer periphery received in the inner periphery of the receptacle;

an end facing the first end of the support member;

a pressing surface extending at acute angles from the outer periphery and the end of the bearing and aligned with the support portion of the support member, the supporting surface faces, abuts with, and is parallel to the pressing surface;

a groove defined by the pressing surface and the inner periphery of the receptacle; and the support portion extends into and fills the groove when the bearing is supported by the support member, wherein the support portion includes a plurality of protrusions, wherein the first end of the support member includes an end face having inner and outer peripheral edges spaced in a radial direction perpendicular to the axis, and wherein each of the plurality of protrusions extends in the radial direction from the outer peripheral edge towards but spaced from the inner peripheral edge of the end face of the first end of the support member.

2. The positioning device as claimed in claim 1, wherein the plurality of protrusions is annularly spaced at regular intervals.

3. The positioning device as claimed in claim 1, wherein each of the plurality of protrusions includes the supporting surface, and wherein the pressing surface of the bearing presses against the supporting surface of each of the plurality of protrusions.

4. The positioning device as claimed in claim 3, wherein the supporting surface of each of the plurality of protrusions is an inclined surface or an arcuate surface.

5. The positioning device as claimed in claim 3, wherein the pressing surface is formed along a peripheral edge of the end of the bearing.

6. The positioning device as claimed in claim 5, wherein the pressing surface is an annular surface adjoining the end of the bearing and the outer periphery of the bearing.

7. The positioning device as claimed in claim 6, wherein the pressing surface is an inclined surface or an arcuate surface.

8. The positioning device as claimed in claim 7, wherein the supporting surface of each of the plurality of protrusions faces the pressing surface of the bearing.

9. The positioning device as claimed in claim 1, wherein the pressing surface is formed along a peripheral edge of the end of the bearing.

10. The positioning device as claimed in claim 1, wherein the pressing surface is an inclined surface or an arcuate surface.

11. The positioning device as claimed in claim 1, wherein the restraining portion includes a plurality of restraining plates extending inward from the inner periphery of the through-hole in a radial direction.

12. The positioning device as claimed in claim 1, wherein each of the plurality of protrusions has an outer surface flush with the outer periphery of the bearing, and wherein the outer surface of each of the plurality of protrusions presses against the inner periphery of the receptacle.

13. The positioning device as claimed in claim 1, wherein the support portion is integrally formed on the first end of the support member, and wherein the support member is detachably received in the receptacle.

* * * * *